(12) United States Patent
Yamada et al.

(10) Patent No.: US 7,476,607 B2
(45) Date of Patent: Jan. 13, 2009

(54) SEMICONDUCTOR ELECTRODE, PRODUCTION PROCESS THEREOF AND PHOTOVOLTAIC CELL USING SEMICONDUCTOR ELECTRODE

(75) Inventors: Yuka Yamada, Nara (JP); Nobuyasu Suzuki, Nara (JP); Yasunori Morinaga, Nara (JP); Hidehiro Sasaki, Neyagawa (JP)

(73) Assignee: Panasonic Corporation, Osaka (JP)

( * ) Notice: Subject to any disclaimer, the term of this patent is extended or adjusted under 35 U.S.C. 154(b) by 169 days.

(21) Appl. No.: 11/448,917

(22) Filed: Jun. 8, 2006

(65) Prior Publication Data

US 2006/0243321 A1    Nov. 2, 2006

Related U.S. Application Data

(63) Continuation of application No. PCT/JP2004/018185, filed on Dec. 7, 2004.

(30) Foreign Application Priority Data

Dec. 8, 2003    (JP)    .............................. 2003-408600

(51) Int. Cl.
*H01L 21/44* (2006.01)

(52) U.S. Cl. ....................... 438/609; 438/608; 438/609; 438/597; 438/596; 438/48; 136/248; 136/252; 136/263; 257/414; 257/431

(58) Field of Classification Search ................. 438/608, 438/609, 597, 596, 48; 427/596, 597, 74, 427/404, 419, 608, 609; 204/157.22, 157.15, 204/157.41, 192.15, 192.1, 192.17, 192.29, 204/192.26; 257/414, 431; 136/248, 252, 136/263

See application file for complete search history.

(56) References Cited

U.S. PATENT DOCUMENTS 7,030,058 B1    4/2006    Nakabayashi

FOREIGN PATENT DOCUMENTS

| JP | 2636158 | 4/1997 |
| JP | 11-345991 A | 12/1999 |

(Continued)

OTHER PUBLICATIONS

Craig Friedrich, Laser Ablation, http://www.me.mtu.edu/~microweb/chap4/ch4-2.htm.*

(Continued)

*Primary Examiner*—Zandra Smith
*Assistant Examiner*—Tsz K Chiu
(74) *Attorney, Agent, or Firm*—McDermott Will & Emery LLP

(57) ABSTRACT

An object of the present invention is to provide a photovoltaic cell that demonstrates a superior photoelectric conversion function. The present invention relates to a photovoltaic cell comprising a semiconductor electrode, an electrolyte and a counter electrode, wherein (1) the semiconductor electrode contains an oxide semiconductor layer having photocatalytic activity, (2) the oxide semiconductor layer contains secondary particles in which primary particles comprising a metal oxide are aggregated, (3) the average particle diameter of the primary particles is from 1 nm to 50 nm, and the average particle diameter of the secondary particles is from 100 nm to 10 μm, and (4) the photovoltaic cell generates electromotive force by radiating light of a wavelength substantially equal to the average particle diameter of the secondary particles onto the semiconductor electrode.

17 Claims, 4 Drawing Sheets

FOREIGN PATENT DOCUMENTS

| | | | |
|---|---|---|---|
| JP | 2000-106222 | | 4/2000 |
| JP | 2001-76772 | | 3/2001 |
| JP | 2001-156321 A | * | 6/2001 |
| JP | 2001-156321 A | | 6/2001 |
| JP | 2001-319698 A | | 11/2001 |
| JP | 2002-25636 A | | 1/2002 |
| JP | 2002-042909 | | 2/2002 |
| JP | 2002-42909 A | | 2/2002 |
| JP | 2002-134435 | | 5/2002 |
| JP | 3309785 | | 5/2002 |
| JP | 2003-142171 | | 5/2003 |

OTHER PUBLICATIONS

C. Jeffrey Brinker, SOL-GEL Science, The Physics and Chemistry of Sol-Gel Processing, Academic Press, Copyright 1989, Elsevier Science.

Nanocrystalline Titanium Oxide Electrodes for Photovoltaic Applications, J. Am. Germ. Soc., 1997.

Sasaki, et al., "Preparation of Metal Oxide Nanoparticles by Laser Ablation," The Review of Laser Engineering, Jun. 2000, pp. 348-353, vol. 28, No. 6.

Chinese Office Action with partial English Translation issued in Chinese Patent Application No. CN 2004-800365467 dated on Apr. 11, 2008.

* cited by examiner (a)

(b)

SEMICONDUCTOR ELECTRODE, PRODUCTION PROCESS THEREOF AND PHOTOVOLTAIC CELL USING SEMICONDUCTOR ELECTRODE

RELATED APPLICATION

This Application is a continuation of International Application No. PCT/JP2004/018185, whose international filing date is Dec. 7, 2004 which in turn claims the benefit of Japanese Patent Application No. 2003-408600, filed on Dec. 8, 2003, the disclosures of which Applications are incorporated by reference herein.

TECHNICAL FIELD

The present invention relates to a semiconductor electrode used as an electrode of a photocatalyst or solar cell, a production process thereof, and a photovoltaic cell using that semiconductor electrode.

BACKGROUND ART

When a semiconductor is exposed to light, electrons having a strong reducing action and holes having a strong oxidizing action are generated. Consequently, a molecular species that contacts the semiconductor is decomposed by oxidation-reduction action. This action of a semiconductor is referred to as photocatalytic action, and ever since the discovery of photodecomposition of water using a semiconductor photoelectrode (the so-called Honda-Fujishima effect), extensive research has been conducted on this action as an effective means of converting light energy to chemical energy. In addition, attempts have been made to utilize this principle to apply semiconductors to, for example, 1) oxidation of organic compounds, 2) organic synthesis such as hydrogenation of unsaturated compounds, 3) removal and decomposition of hazardous chemical substances in waste liquids or exhaust gas, and 4) sterilization or decontamination.

Known examples of semiconductor photocatalytic materials include titanium dioxide (titania) as well as vanadium pentoxide, zinc oxide, tungsten oxide, copper oxide, iron oxide, strontium titanate, barium titanate, sodium titanate, cadmium sulfide, zirconium dioxide and iron oxide. Moreover, co-catalysts obtained by loading metals such as platinum, palladium, rhodium and ruthenium on these semiconductors are also known to be effective as photocatalysts.

Semiconductor powders having a particle diameter on the micron level have frequently been used in conventional photocatalyst research. The conversion of these semiconductor powders into films is essential for the practical application of photocatalysts. Consequently, they are known to be used by fixing to materials such as resins and glass or used in the form of thin films. However, the amount of the catalyst itself is insufficient, and the effect is unsatisfactory. In addition, although the surface area of the catalyst layer may be increased to increase the amount of catalyst, design limitations are normally encountered when this is attempted.

On the other hand, since an electrode output can be obtained from semiconductor materials like those described above when light is radiated onto an n-type semiconductor, they are also used for the electrode materials and so forth of wet photovoltaic cells utilizing photo-sensitive electrolysis phenomena. In recent years, there has been considerable activity in the development of dye-sensitized solar cells in particular. The primary structure of the semiconductor electrode serving as the working electrode consists of a dye sensitizer adsorbed onto a semiconductor porous film. Examples of materials used for these semiconductors include titanium dioxide (titania), tin oxide, zinc oxide and niobium oxide, while ruthenium complexes are used for the sensitizing dye. Although these dye-sensitized solar cells have a simpler structure and are less expensive than conventional silicon solar cells, improvement of conversion efficiency is the issue of greatest importance in terms of achieving practical application.

In a photocatalyst or photoelectrode, the use of a porous or fine particulate oxide semiconductor material has been studied so as to realize a structure having low density and large specific surface area for the oxide semiconductor in order to obtain greater optical activity with less volume. For example, a method has been disclosed for obtaining a titanium oxide porous thin film photocatalyst having pores of a uniform pore diameter of 1 nm to 2 µm by coating a titania sol onto a substrate followed by heating and baking (see, for example, Patent Document 1). In addition, the structure of a metal oxide porous body and production process thereof has been disclosed in which the pore size frequency distribution of fine pores has a plurality of peak values (see, for example, Patent Document 2). Studies have also been conducted on increasing specific surface area by using finer particles. For example, a method has been disclosed for obtaining an oxide semiconductor electrode having a porous oxide semiconductor layer containing hollow particles comprising a metal oxide having an average particle diameter of 200 nm to 10 µm (see, for example, Patent Document 3).

Patent Document 1: Japanese Patent No. 2636158 (pp. 1-3)
Patent Document 2: Japanese Patent No. 3309785 (pp. 1-5)
Patent Document 3: Japanese Published Patent Application No. 2001-76772 (pp. 1-6, FIGS. 1-4)

Examples other documents relating to the present invention include: Sasaki, T. et al.: "Preparation of Metal Oxide Nanoparticles by Laser Ablation", Laser Research, Vol. 28, No. 6, June 2000, Japanese Published Patent Application No. 2003-142171 (and particularly paragraphs [0107] to [0110]).

The above-mentioned document discloses the obtaining of a semiconductor electrode for a solar cell by coating a slurry containing two types of titanium oxide particles having different particle diameters onto a glass substrate followed by drying.

Japanese Published Patent Application No. 2000-106222.

This publication discloses a semiconductor electrode for a solar cell having two types of titanium oxide particles of having different particle diameters.

Japanese Published Patent Application No. 2002-134435.
International Publication No. WO 00/30747

DISCLOSURE OF THE INVENTION

However, since this reaction occurs at the interface of the oxide semiconductor material in photocatalysts and semiconductor electrodes, reaction efficiency cannot be improved no matter how much specific surface area is increased unless a charge transporting substance and reactant are diffused over the entire interface within the oxide semiconductor layer.

Namely, in a method in which an organic gel is made to be porous by heating and baking as in the first example of the prior art (Patent Document 1), although pores having a uniform pore diameter of the nanometer size are obtained, the portion other than the pores is in the form of a dense film. Consequently, although the specific surface area is large, since the reactants and so forth cannot be diffused to the inside of the film resulting in the reaction only occurring on the surface of the film, reaction efficiency cannot be improved.

On the other hand, in contrast to encountering the same problems as described above in the case of densely layering small microparticles having a particle diameter of several tens of nanometers as in the second example of the prior art (Patent Document 3), by using hollow particles having an average particle diameter of about 200 nm or more, a structure is obtained that promotes diffusion and adsorption of the reactants and so forth while securing specific surface area. However, in this constitution, there is no increase in the reaction active points due to the low density of the oxide semiconductor material. In addition, although the reaction only occurs in photocatalysts and photoelectrodes after electrons and holes formed by photoexcitation within an oxide semiconductor migrate to the interface, the migration distance is long. Namely, if pore diameter is excessively large, the electrons and holes end up recombining before migrating to the interface.

Thus, with the foregoing in view, a primary object of the present invention is to provide a photovoltaic cell that demonstrates a superior photoelectric conversion function. In addition, another object of the present invention is to provide a semiconductor electrode capable of realizing higher photoelectromotive force.

As a result of conducting extensive studies with the foregoing problems of the prior art in view, the inventors of the present invention found that the above-mentioned objects can be achieved by using a specific semiconductor material for the semiconductor electrode of a photovoltaic cell, thereby leading to completion of the present invention.

The present invention relates to the following semiconductor electrode, a production process thereof, and a photovoltaic cell that uses that semiconductor electrode.

1. A photovoltaic cell comprising a semiconductor electrode, an electrolyte and a counter electrode; wherein,
   (1) the semiconductor electrode comprises an oxide semiconductor layer having photocatalytic activity;
   (2) the oxide semiconductor layer contains secondary particles in which primary particles composed of a metal oxide are aggregated;
   (3) the average particle diameter of the primary particles is from 1 nm to 50 nm, and the average particle diameter of the secondary particles is from 100 nm to 10 µm; and,
   (4) the photovoltaic cell generates electromotive force by irradiating the semiconductor electrode with light having a wavelength substantially equal to the average particle diameter of the secondary particles.

2. The photovoltaic cell according to above 1, wherein the metal oxide is an oxide containing at least one type selected from the group consisting of titanium, tin, zinc, zirconium, niobium, cesium, tungsten, copper, iron and vanadium.

3. The photovoltaic cell according to above 1, wherein the metal oxide is at least one type of oxide selected from the group consisting of titanium oxide, tin oxide, zinc oxide, zirconium oxide, niobium oxide, cesium oxide, tungsten oxide, copper oxide, iron oxide, vanadium pentoxide, strontium titanate, barium titanate, sodium titanate, $K_4Nb_6O_{17}$, $Rb_4Nb_6O_{17}$, $K_2Rb_2Nb_6O_{17}$ and $Pb_{1-x}K_{2x}NbO_6$ (0<x<1), or a mixed oxide containing two or more types of these oxides.

4. The photovoltaic cell according to above 1, wherein the oxide semiconductor layer is formed on a conductive substrate.
5. The photovoltaic cell according to above 1, wherein a dye is supported on the oxide semiconductor layer.

6. An electricity generation method of a photovoltaic cell in which the photovoltaic cell comprises a semiconductor electrode, an electrolyte and a counter electrode; wherein,
   (1) the semiconductor electrode comprises an oxide semiconductor layer having photocatalytic activity;
   (2) the oxide semiconductor layer contains secondary particles in which primary particles composed of a metal oxide are aggregated; and,
   (3) the average particle diameter of the primary particles is from 1 nm to 50 nm, and the average particle diameter of the secondary particles is from 100 nm to 10 µm; and,
   the electricity generation method comprises a step of irradiating the semiconductor electrode with light having a wavelength substantially equal to the average particle diameter of the secondary particles.

7. The method according to above 6, wherein the metal oxide is an oxide containing at least one type selected from the group consisting of titanium, tin, zinc, zirconium, niobium, cesium, tungsten, copper, iron and vanadium.

8. The method according to above 6, wherein the metal oxide is at least one type selected from the group consisting of titanium oxide, tin oxide, zinc oxide, zirconium oxide, niobium oxide, cesium oxide, tungsten oxide, copper oxide, iron oxide, vanadium pentoxide, strontium titanate, barium titanate, sodium titanate, $K_4Nb_6O_{17}$, $Rb_4Nb_6O_{17}$, $K_2Rb_2Nb_6O_{17}$ and $Pb_{1-x}K_{2x}NbO_6$ (0<x<1), or a mixed oxide containing two or more types of these oxides.

9. The method according to above 6, wherein the oxide semiconductor layer is formed on a conductive substrate.

10. The method according to above 6, wherein a dye is loaded onto the oxide semiconductor layer.

11. A semiconductor electrode used in a photovoltaic cell, wherein:
    (a) the electrode comprises an oxide semiconductor layer containing secondary particles in which primary particles composed of a metal oxide are aggregated;
    (b) the average particle diameter of the primary particles is from 1 nm to 50 nm, and the average particle diameter of the secondary particles is from 100 nm to 10 µm; and,
    (c) the photovoltaic cell generates electromotive force by irradiating the semiconductor electrode with light having a wavelength substantially equal to the average particle diameter of the secondary particles.

12. The semiconductor electrode according to above 11, wherein the metal oxide is an oxide containing at least one type selected from the group consisting of titanium, tin, zinc, zirconium, niobium, cesium, tungsten, copper, iron and vanadium.

13. The semiconductor electrode according to above 11, wherein the metal oxide is at least one type selected from the group consisting of titanium oxide, tin oxide, zinc oxide, zirconium oxide, niobium oxide, cesium oxide, tungsten oxide, copper oxide, iron oxide, vanadium pentoxide, strontium titanate, barium titanate, sodium titanate, $K_4Nb_6O_{17}$, $Rb_4Nb_6O_{17}$, $K_2Rb_2Nb_6O_{17}$ and $Pb_{1-x}K_{2x}NbO_6$ (0<x<1) or a mixed oxide containing two or more types of these oxides.

14. The semiconductor electrode according to above 11, wherein the oxide semiconductor layer is formed on a conductive substrate.

15. The semiconductor electrode according to above 11, wherein a dye is loaded on the oxide semiconductor layer.

16. A method for producing a semiconductor electrode for generating photoelectromotive force, the method comprising a step of irradiating a target plate composed of a metal oxide with laser light in an ambient gas to eliminate and deposit the component of the target plate on a substrate opposing the target plate in a substantially parallel manner; wherein when the gas density of the ambient gas is defined as ρ (grams/liter), the gas pressure of the inert gas is defined as P (pascals), and the distance between the target plate and the substrate is defined as D (millimeters), then $\rho \cdot P \cdot D^2$ is from $3.0 \times 10^4$ to $6.0 \times 10^5$.

17. The method according to above 16, wherein the semiconductor electrode comprises an oxide semiconductor layer containing secondary particles in which primary particles composed of a metal oxide are aggregated; and, the average particle diameter of the primary particles is from 1 nm to 50 nm, and the average particle diameter of the secondary particles is from 100 nm to 10 μm.

18. The method according to above 16, wherein an inert gas is used as the ambient gas.

19. The method according to above 16, wherein a mixed gas of an inert gas and a reactive gas is used as the ambient gas.

20. The method according to above 19, wherein the ratio of the reactive gas is from 0.1% to 50% in terms of the mass flow rate ratio.

21. The method according to above 19, wherein the reactive gas is an oxidizing gas.

22. The method according to above 21, wherein the oxidizing gas is a gas containing oxygen gas.

23. The method according to above 19, wherein the reactive gas is activated by imparting energy thereto.

24. The method according to above 16, wherein the average particle diameter of at least one of the primary particles and secondary particles is controlled by changing the pressure of the ambient gas.

25. The method according to above 16, further comprising a step of heating the component.

26. The method according to above 25, wherein the heating temperature is from 500° C. to 900° C.

27. The method according to above 16, wherein the $\rho \cdot P \cdot D^2$ is from $5.9 \times 10^4$ to $3.0 \times 10^5$.

28. The method according to above 16, wherein the $\rho \cdot P \cdot D^2$ is from $1.5 \times 10^5$ to $3.0 \times 10^5$.

Advantages of the Invention

According to the semiconductor electrode of the present invention, by using an oxide semiconductor nanostructure having a structure composed of secondary particles in which primary particles comprising a metal oxide are aggregated as an electrode material (electrode activator), quantum efficiency can be increased by efficient charge separation in the primary particles, and the utilization rate of the incident light can be enhanced by the secondary particle structure. As a result, an efficient photoelectrode reaction can be carried out. Namely, higher photoelectromotive force (photoelectromotive current) can be obtained.

In addition, since the production process of a semiconductor electrode (oxide semiconductor nanostructure) of the present invention is a high-purity vapor phase thin film process, an oxide semiconductor nanostructure having high purity and few surface defects can be directly deposited on a substrate. Consequently, a production process can be provided that facilitates thin film formation and fixation of an oxide semiconductor material.

Since the photovoltaic cell of the present invention employs an oxide semiconductor layer having a structure composed of secondary particles in which primary particles comprising a metal oxide are aggregated, a photoelectrode reaction can be performed efficiently and as a result, a superior photoelectric conversion function can be achieved.

Figure 1:
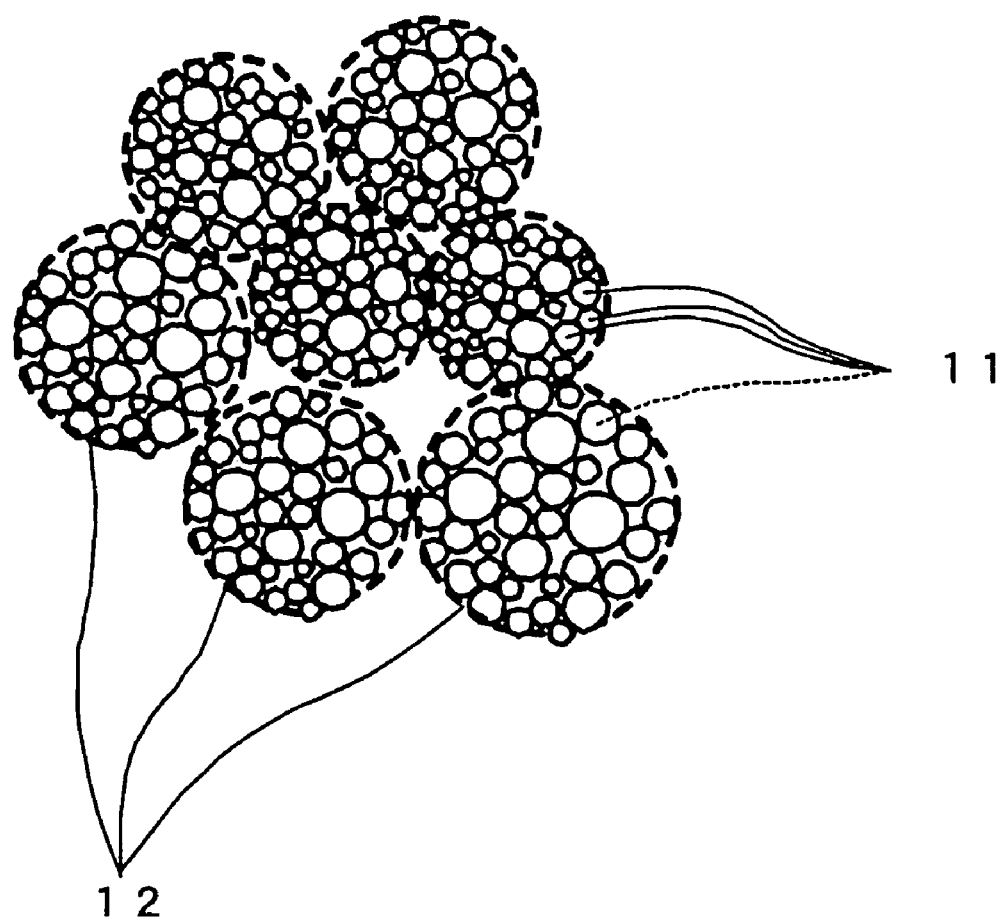
FIG. 1 is a structural schematic drawing of an oxide semiconductor nanostructure having a structure composed of secondary particles in which primary particles comprising a metal oxide are aggregated in an embodiment of the present invention.

LIST OF ELEMENTS 11 primary particles
12 secondary particles
201 reaction chamber
202 ultra-high vacuum exhaust system
203 mass flow controller
204 gas intake line
205 gas exhaust system
206 target holder
207 target
208 pulsed laser light source
209 substrate
210 laser intake window
211 slit
212 lens
213 reflecting mirror
214 plume
41 semiconductor electrode
42 conductive substrate
43 oxide semiconductor layer
44 glass substrate
45 conductive film
51 counter electrode
52 electrolyte layer
53 substrate
54 conductive film

BEST MODE FOR CARRYING OUT THE INVENTION

The photovoltaic cell of the present invention is a photovoltaic cell comprising a semiconductor electrode, an electrolyte and a counter electrode, wherein
 (1) the semiconductor electrode contains an oxide semiconductor layer having photocatalytic activity;
 (2) the oxide semiconductor layer contains secondary particles in which primary particles composed of a metal oxide are aggregated;
 (3) the average particle diameter of the primary particles is from 1 nm to 50 nm, and the average particle diameter of the secondary particles is from 100 nm to 10 μm; and,
 (4) the photovoltaic cell generates electromotive force by irradiating the semiconductor electrode with light having a wavelength substantially equal to the average particle diameter of the secondary particles.

As the basic constituent elements, the photovoltaic cell of the present invention may comprise a semiconductor electrode, an electrolyte and a counter electrode. Other constituent elements employed in known photovoltaic cells can also be used as necessary (such as conductive substrates, lead wires and so forth).

Figure 5:
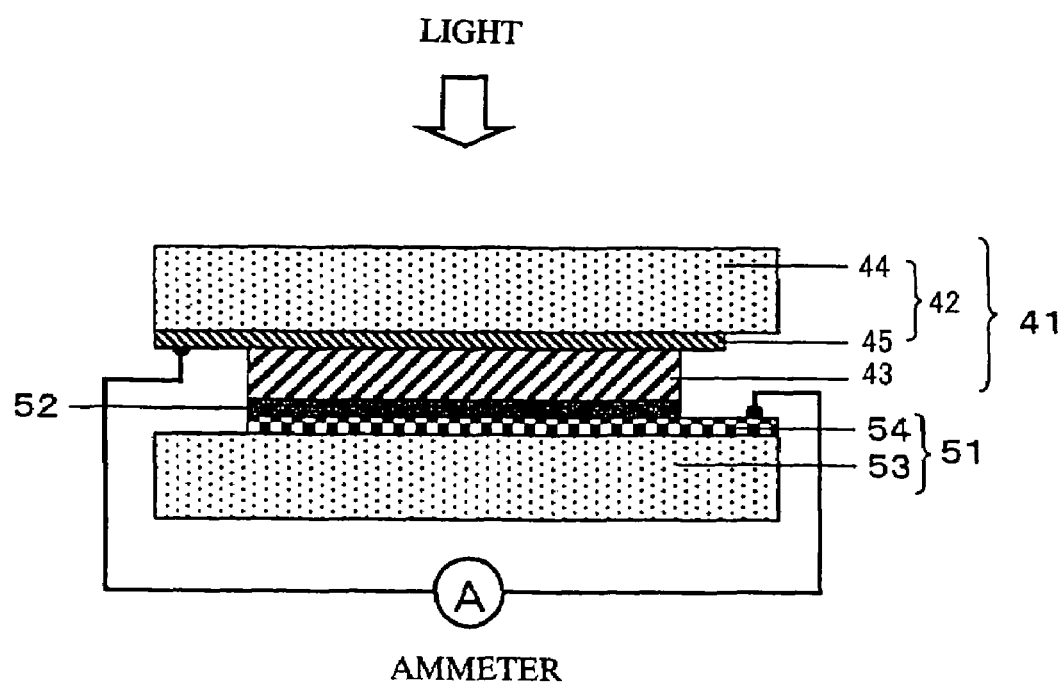

As to the constitution of the photovoltaic cell, the constitution of known photovoltaic cells can be employed. An example of a preferred embodiment thereof consists of a wet photochemical voltaic cell in which a semiconductor electrode and counter electrode are connected through an electrolyte solution (electrolyte). FIG. 5 shows the constitution (cross-sectional view) of a photovoltaic cells having a semiconductor electrode. This photovoltaic cell has a constitution in which a semiconductor electrode 41, an electrolyte layer 52 and a counter electrode 51 are layered in sequence.

Counter Electrode

As shown in FIG. 5, a constitution in which a conductive film 54 is formed on a substrate 53 can be preferably employed for counter electrode 51.

There are no particular limitations on the material used for substrate 53 that composes counter electrode 51, and various types of transparent materials or opaque materials can be used. Glass is used particularly preferably in the present invention.

In addition, there are no particular limitations on the material used for conductive film 54 provided it is a conductor. Platinum, palladium, rhodium or ruthenium and the like, which have a small overvoltage relative to oxidation-reduction reactions, is preferable in the present invention.

Electrolyte Layer (Electrolyte)

Electrolyte layer 52 may at least contain a substance system (reduction system) that causes a reversible change in the oxidation/reduction state. Examples of reduction systems include iodide ion/iodine, bromide ion/bromine, quinone/hydroquinone, iron (II) ion/iron (III) ion, and copper (I) ion/copper (II) ion. In addition, polar solvents such as water, acetonitrile, pyridine, dimethyl acetoamide or ethylene carbonate, or mixtures thereof, can be used for the solvent. Moreover, a supporting electrolyte may be added to electrolyte layer 52 for the purpose of increasing the electrical conductivity of electrolyte layer 52. Examples of supporting electrolytes that may be used include calcium chloride, sodium sulfate and ammonium chloride.

The electrolyte can be introduced between the semiconductor electrode and counter electrode using, for example, capillary action. In addition, a solid electrolyte can also be used for the electrolyte in the present invention. Known or commercially available solid electrolytes can be used for the solid electrolyte.

Semiconductor Electrode

Figure 4:
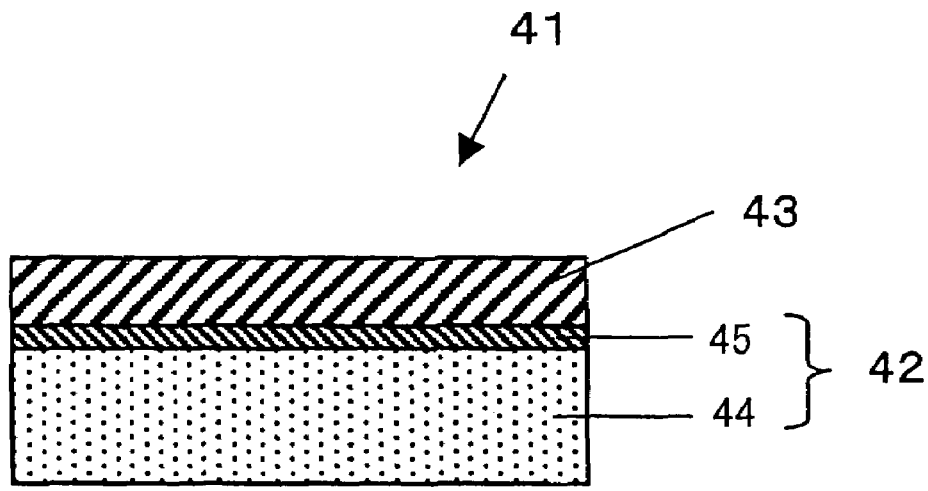
FIG. 4 is a cross-sectional view of the constitution of a semiconductor electrode in an embodiment of the present invention; and, FIG. 5 is a cross-sectional view of the constitution of a photovoltaic cell that uses a semiconductor electrode in an embodiment of the present invention.

Semiconductor electrode 41 comprises an oxide semiconductor layer having photocatalytic activity. For example, a constitution in which an oxide semiconductor layer is formed on a conductive substrate can be employed as a semiconductor electrode. More specifically, as shown in FIG. 4, a laminate in which an oxide semiconductor layer 43 is formed on a conductive film 45 of conductive substrate 42 comprising substrate 44 and conductive film 45 formed on the substrate can be preferably used as semiconductor electrode 41.

1) Conductive Substrate

A laminate comprised of conductive film 45 formed on substrate 44, for example, can be preferably used as conductive substrate 42.

There are no particular limitations on the material used for substrate 44 that composes conductive substrate 42, and various types of transparent materials or opaque materials can be used. Glass is used particularly preferably. In addition, there are also no limitations on the material used for conductive film 45, and a typical example is ITO. A transparent electrode in which tin oxide or indium oxide is doped with a cation or anion having a different valence is used preferably.

Conductive film 45 may be formed on substrate 44 by a coating method such as vacuum deposition, sputtering, CVD or sol gel using a component that is able to form conductive film 45.

2) Oxide Semiconductor Layer

Oxide semiconductor layer 43 contains secondary particles in which primary particles comprising a metal oxide are aggregated. The secondary particles are preferably the major constituent component of the oxide semiconductor layer.

There are no particular limitations on the metal oxide provided it is able to demonstrate photocatalytic activity as previously described. In the present invention, at least one type of oxide selected from the group consisting of titanium, tin, zinc, zirconium, niobium, cesium, tungsten, copper, iron and vanadium can be used particularly preferably. For example, at least one type of oxide selected from the group consisting of titanium oxide, tin oxide, zinc oxide, zirconium oxide, niobium oxide, cesium oxide, tungsten oxide, copper oxide, iron oxide, vanadium pentoxide, strontium titanate, barium titanate, sodium titanate, $K_4Nb_6O_{17}$, $Rb_4Nb_6O_{17}$, $K_2Rb_2Nb_6O_{17}$ and $Pb_{1-x}K_{2x}NbO_6$ ($0<x<1$), or a mixed oxide containing two or more types of these oxides, can be used. In the present invention, at least one type of titanium oxide, niobium oxide or iron oxide and the like is particularly preferable.

The secondary particles, which are a major constituent component of the oxide semiconductor layer, have a structure in which secondary particles 12 are formed as a result of aggregation of primary particles 11 composed of a metal oxide as schematically shown in FIG. 1.

The average particle diameter of the primary particles is from 1 nm to 50 nm, and preferably from 1 nm to 20 nm. As a result of making the average particle diameter of primary particles 11 to be within the above-mentioned range, in addition to imparting numerous catalyst active points by increasing the specific surface area, electron-hole pairs are efficiently formed by photoexcitation within the oxide semiconductor comprising a metal oxide, thereby increasing quantum efficiency as a result of the formed electrons and holes migrating to the interface without recombining. In the case the average particle diameter of the primary particles 11 exceeds 50 nm, specific surface area decreases thereby decreasing optical activity and causing the electrons and holes formed by photoexcitation to tend to recombine in the oxide semiconductor.

In addition, the average particle diameter of the secondary particles is from 100 nm to 10 μm, and preferably from 250 nm to 1 μm. As a result of setting the average particle diameter to be within the above-mentioned range, a space that promotes effective diffusion and adsorption of charge transporting substances and reactants can be formed. In addition, since the average particle diameter can be set to a size that is equal to the wavelength of the incident light, scattering and absorption can be increased thereby making it possible to enhance light utilization efficiency. In the case the average particle diameter of secondary particles 12 is less than 100 nm, scattering and absorption effects of incident light within the oxide semiconductor nanostructure tend to be limited to short wavelength components. In addition, scattering and absorption effects of the incident light are also weakened in the case the average particle diameter exceeds 10 μm.

Although the secondary particles are a major constituent component of the oxide semiconductor layer, other components may be contained so long as the components do not adversely affect the advantages of the invention. For example, a dye may be added in the oxide semiconductor layer. A dye that is sensitive to visible light is preferably used for the dye. As a result, the semiconductor electrode is able to effectively absorb sunlight and generate high photoelectromotive force. Any dyes can be used provided they bring about a sensitizing action. Particularly preferable examples of dyes include xanthene dyes such as Rhodamine B, Rose Bengal, eosin and erythrocine; cyanine dyes such as quinocyanine and cryptocyanine; basic dyes such as phenosafranine, thiocine and methylene blue; porphyrin dyes such as chlorophyll, zinc porphyrin and magnesium porphyrin; complexes such as azo dyes, phthalocyanine compounds and tris-bipyridyl Ru. Anthraquinone dyes and polycyclic quinone dyes can also be used.

Furthermore, examples of methods for imparting dye include 1) loading using a colloid, 2) reducing with hydrogen or a reducing agent after loading a precursor such as a metal salt, and 3) baking a precursor such as a metal salt. Alternatively, a method can also be employed in which the dye is evaporated in a vacuum and then adsorbed in a gaseous phase.

In the present invention, as shown in FIGS. 4 and 5 for example, oxide semiconductor layer 43 is formed on conductive film 45 of conductive substrate 42 in which conductive film 45 has been formed on substrate 44. Oxide semiconductor 43 is then laminated so as to contact an electrolyte 52, and counter electrode 51 is disposed on the opposite side of electrolyte 52. Counter electrode 51 has conductive film 54 formed on substrate 53, and conductive film 54 is laminated so as to contact electrolyte 52.

The photovoltaic cell of the present invention generates electromotive force by the semiconductor electrode being irradiated with light having a wavelength substantially equal to the average particle diameter (namely, from 100 nm to 10 μm) of the secondary particles. Thus, the light used can be suitably selected according to the average particle diameter of the secondary particles. In addition, the above-mentioned light may be monochromatic light as described above or polychromatic light containing light of a wavelength other than the above-mentioned wavelength. Sunlight, for example, can be used as polychromatic light.

The photovoltaic cell of the present invention is able to generate electromotive force by radiating light as described above at least onto the semiconductor electrode. The illuminance of the light is not limitative and can be suitably set according to the usage method of the photovoltaic cell, desired electromotive force and so forth. In addition, there are no particular limitations on the method used to radiate light onto the semiconductor electrode. For example, as shown in FIG. 5, light may be radiated onto semiconductor electrode 43 via a transparent conductive substrate 42.

Semiconductor Electrode Production Process

The production process of the semiconductor electrode is not limitative, and, for example, the following process can be used. Namely, a semiconductor electrode for generating photoelectromotive force can be produced by a process comprising a step in which a composite substance of a target plate is desorbed by radiating laser light onto a target plate comprising a metal oxide, and the desorbed substance is deposited on a substrate opposing the target plate in a substantially parallel manner. The following provides an explanation of a typical example of this production process.

The metal oxide used as the starting raw material can be suitably selected according to the desired semiconductor electrode (composite component). For example, a metal oxide listed in the above-mentioned section 2) can be used. More specifically, an oxide containing at least one type selected from the group consisting of titanium, tin, zinc, zirconium, niobium, cesium, tungsten, copper, iron and vanadium can be preferably used. For example, at least one type of oxide selected from the group consisting of titanium oxide, tin oxide, zinc oxide, zirconium oxide, niobium oxide, cesium oxide, tungsten oxide, copper oxide, iron oxide, vanadium pentoxide, strontium titanate, barium titanate, sodium titanate, $K_4Nb_6O_{17}$, $Rb_4Nb_6O_{17}$, $K_2Rb_2Nb_6O_{17}$ and $Pb_{1-x}K_{2x}NbO_6$ (0<x<1), or a mixed oxide containing two or more types of these oxides, can be used. In the present invention, at least one type such as titanium oxide, niobium oxide or iron oxide is particularly preferable.

These metal oxides may be crystalline or amorphous. In addition, in the case they are crystalline, polycrystal or single crystal can be used. Thus, a sintered body of a metal oxide, for example, can be used preferably.

The shape of the target plate comprising a metal oxide is not limitative, and may be of a shape that is suited for irradiation with laser light. For example, a metal oxide having a thickness of about 0.5 mm to 10 mm can be preferably used as a target plate. The target plate may use a suitable support, and the metal oxide may be laminated thereon. Furthermore, the size of the target plate may be suitably set according to the conditions of laser ablation and so forth.

There are no particular limitations on the substrate, and substrates composed of various materials such as Si and $SiO_2$, for example, can be used.

In the present invention, the component of the target plate is desorbed by radiating a light beam onto the target plate, and the desorbed component is deposited on a substrate opposing the target plate in a substantially parallel manner. Namely, a laser ablation method (and preferably a pulsed laser ablation method) can be used in the present invention. The laser ablation method can also be carried out using known reaction apparatus and so forth.

The laser ablation method refers to a method by which laser light having a high energy density (particularly 0.5 J/cm² or more and preferably 0.5 J/cm² to 2 J/cm²) is radiated onto a target to melt and desorb the target surface. The pulsed ablation method uses pulsed laser light for the laser light.

A characteristic of the laser ablation method is that has non-thermal equilibrium and non-mass properties. A specific effect of having non-thermal equilibrium properties is the potential for spatial- and time-selective excitation. Laser ablation is particularly advantageous in terms of spatial-selective excitation. Namely, in contrast to a considerably broad area of the reaction tank or the entire reaction tank being exposed to heat and ions in the case of conventional heat processes or plasma processes, in the case of laser ablation, since only the required substance source can be excited, a clean process that inhibits contamination by impurities can be realized. In addition, non-mass prcess means that there is far less damage as compared with similar non-thermal equilibrium ion processes. Substances that are desorbed by laser ablation are primarily ions and neutral particles in the form of atom, molecule or clusters (composed of several to several tens of atoms). And their kinetic energy reaches the level of several tens of eV in the case of ions and several eV in the case of neutral particles. Although this level of energy is much higher than ions that have been evaporated by heating, it is much lower than that produced by an ion beam.

In this manner, a clean, low-damage laser ablation process is suited for the production of an oxide semiconductor nanostructure in which contamination by impurities, composition, crystallinity and so forth are controlled (in the present specification, this "oxide semiconductor nanostructure" may simply be referred to as a "nanostructure"). In this case, the target material preferably absorbs light in the wavelength band of the laser light serving as the light source to carry out the production of this nanostructure using laser ablation.

In the production process of the present invention, the pulse width in the case of using pulsed laser light for the laser light is particularly preferably from 5 ns to 20 ns. In addition, the wavelength is typically preferably from 150 nm to 700 nm. The pulse energy is normally preferably from 10 mJ to 500 mJ. In addition, the repetition frequency is normally preferably from 5 Hz to 1 KHz.

There are no particular limitations on the laser medium (type of laser) of the laser light, and for example, a gas laser such as an excimer laser or a solid laser such as YAG laser can be employed. It is particularly preferable to used an excimer laser, and especially an excimer laser that uses a halogen gas or a noble gas for the laser medium. For example, an ArF laser, which uses fluorine gas and argon for the laser medium, can be used preferably.

Figure 2:
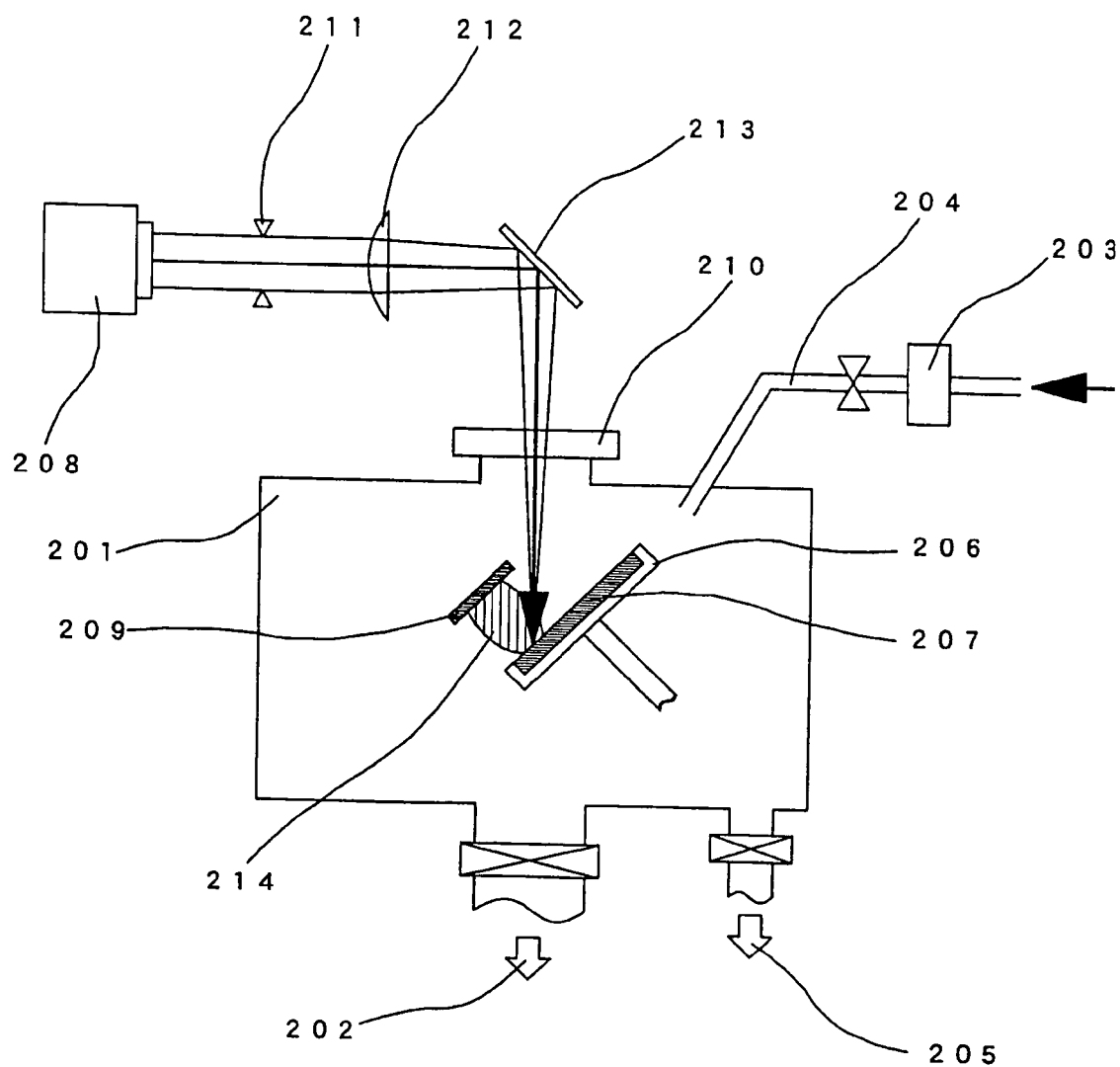
FIG. 2 is a block drawing showing a nanostructure production apparatus used in the production process of an oxide semiconductor nanostructure in an embodiment of the present invention.

When depositing the component that has been desorbed from the target plate in the present invention in particular, the component is deposited on a substrate opposing the target plate in a substantially parallel manner (FIG. 2). In other words, the desorbed component is deposited on the substrate with the target plate and substrate disposed substantially parallel to each other. This type is referred to as an on-axis state, and differs from a so-called off-axis state (in which the component is deposited on a substrate with the target plate and substrate disposed nearly perpendicular to each other). In the present invention, depositing the substance in the on-axis state enables the ultimately obtained metal oxide nanostructure to demonstrate superior oxidation-reduction properties as compared with an off-axis state.

Thus, in the case of carrying out on-axis laser ablation using an existing reaction apparatus and so forth, it is preferable to install the target plate and substrate within the reaction system so that the target plate and substrate are in opposition and nearly parallel to each other in advance.

In addition, in the case of using a reaction apparatus, in order to control the size of the high-temperature and high-pressure region formed in the vicinity of the target plate as a result of radiating the target plate with a beam of light, at least one of either 1) the pressure of the ambient gas or 2) the distance between the target plate and substrate can be adjusted. As a result, a metal nanostructure can be efficiently formed on the substrate.

In the production process of the present invention, it is preferable to use a suitable ambient gas. The type of ambient gas can be suitably selected according to the type (desired oxidation number and the like) of the target oxide semiconductor nanostructure. Normally an inert gas can be used. Examples of inert gases that can be used include Ar, He and $N_2$.

In addition, a mixed gas of an inert gas and reactive gas can also be used as necessary. According to this method, compatibility with other processes can be achieved as compared with the case of using an inert gas alone. Namely, the effects of reactive gas species remaining in the chamber and so forth can be ignored. An example of a reactive gas that can be used is an oxidizing gas. In the case of using a reactive gas, although the content ratio of the reactive gas may be suitably determined according to the type, desired characteristics and so forth of the reactive gas, the ratio of the reactive gas is normally set to be within the range of 0.1% to 50% in terms of the mass flow rate ratio.

An oxidizing gas can be particularly preferably used for the reactive gas. Specific examples of oxidizing gases include various gases such as $O_2$ (oxygen), $O_3$ and $NO_2$. A gas containing oxygen can be used particularly preferably for the oxidizing gas.

The pressure of the ambient gas can be suitably set according to the composition of the ambient gas and so forth. In particular, the pressure is preferably adjusted to be within the range of 13.33 Pa to 1333 Pa with respect to being able to preferably produce a metal oxide nanostructure having the same composition as the target material.

In the present invention, the pressure of the ambient gas can also be changed as necessary. As a result, the structure of the nanostructure in the direction of deposition can be controlled, and the physical properties of the metal oxide nanostructure can be controlled.

In addition, the ambient gas can be activated by imparting energy to the ambient gas. As a result, the valence of the metal can be increased. Examples of methods that can be used to impart energy to the ambient gas include ultraviolet light irradiation and electron beam irradiation.

A metal oxide nanostructure can ultimately be formed on a substrate by depositing a substance desorbed from the target plate in this manner. In general, substances (such as atoms, molecules, ions or clusters) desorbed from a target plate by laser ablation are deposited on the substrate while aggregating or growing, ultimately resulting in the formation of a metal oxide nanostructure on that substrate that is composed of secondary particles in which primary particles are aggregated.

In the present invention, the deposited substance (metal oxide nanostructure) can be further heated as necessary. A metal oxide nanostructure immediately after deposition in particular may contain crystal defects, unpaired electron bonds and so forth. In the case these are present, they cause decreased photoelectric conversion function as a result of acting as recombination sites for electrons and holes formed by photoexcitation. In such cases, it is effective to heat the nanostructure to improve crystallinity, purity and so forth. Although the heating temperature is not limitative, it is particularly preferably set to be within the range of 500° C. to 900° C. The heating atmosphere is preferably an oxidizing atmosphere such as an oxygen atmosphere.

Embodiment

The following provides a detailed explanation of a process for producing an oxide semiconductor nanostructure as previously described in the present mode for carrying out the invention using as an example the case of using titanium oxide.

In the present mode for carrying out the invention, titanium oxide is deposited on a substrate using laser ablation in an ambient gas.

FIG. 2 is a drawing showing the constitution of a nanostructure production apparatus used to produce a titanium oxide nanostructure of the present invention. Here, an explanation is provided of the case of producing a titanium oxide nanostructure like that schematically shown in FIG. 1 by carrying out laser ablation using a titanium dioxide ($TiO_2$) sintered body for the target.

In FIG. 2, reference symbol 201 indicates a metal reaction chamber in which a target is disposed. An ultra-high vacuum exhaust system 202 for drawing an ultra-high vacuum within reaction chamber 201 by evacuating air from reaction chamber 201 is provided in the bottom of reaction chamber 201. A gas intake line 204 for supplying ambient gas to reaction chamber 201 is attached to reaction chamber 201. A mass flow controller 203 for controlling the flow rate of ambient gas supplied to reaction chamber 201 is attached to this gas intake line 204. In addition, a gas exhaust system 205 for differentially evacuating ambient gas within reaction chamber 201 is provided in the bottom of reaction chamber 201. Furthermore, a valve is provided in gas intake line 204 between reaction chamber 201 and mass flow controller 203. In addition, valves are respectively provided between ultra-high vacuum exhaust system 202 and reaction chamber 201 and between gas exhaust system 205 and reaction chamber 201.

A target holder 206 for holding a target 207 is disposed within reaction chamber 201. A rotating shaft 206a is attached to this target holder 206, and target 207 is rotated (8 rotations/minute) by this rotating shaft under the control of a rotation control unit which is not shown. A substrate 209 is disposed so as to oppose the surface of this target 207. As shown in the drawing, the target (plate) and substrate are preferably disposed so as to be substantially parallel. Namely, they are preferably disposed in an on-axis state. A substance desorbed and injected from target 207 excited by irradiating with laser light is deposited on this substrate 209. Here, a titanium dioxide ($TiO_2$) polycrystalline sintered body target (purity: 99.9%) is used for the target.

A pulsed laser light source 208 for radiating an energy beam in the form of laser light onto target 207 is disposed outside of reaction chamber 201. A laser intake window 210 for introducing laser light into reaction chamber 201 is attached to the top of reaction chamber 201. A slit 211, a lens 212 and a reflecting mirror 213 are disposed in order starting closest to laser light source 208 in the light path of laser light emitted from pulsed laser light source 208, and laser light emitted from pulsed laser light source 208 is shaped by slit 211, converged by lens 212, reflected by reflecting mirror 213, and radiated onto target 207 installed within reaction chamber 201 through laser intake window 210.

The following provides an explanation of the operation of a nanostructure production apparatus having the constitution described above. After evacuating the inside of reaction chamber 201 to an attainable vacuum of about $1.0 \times 10^{-6}$ Pa with ultra-high vacuum exhaust system 202 consisting primarily of a turbo molecular pump, He gas is introduced from gas intake line 204 via mass flow controller 203. Here, the ambient noble gas pressure within reaction chamber 201 is set to a constant pressure within the range of about 10 to 1000 Pa by coordinating with the operation of gas exhaust system 205 consisting primarily of a scroll pump or helical pump.

While in this state, laser light is radiated from pulsed laser light source 208 onto the surface of $TiO_2$ polycrystalline sintered body target 207 having a purity of 99.9% disposed in target holder 206 having a revolving mechanism. An argon fluoride (ArF) excimer laser (wavelength: 193 nm, pulse width: 12 ns, pulse energy: 50 mJ, energy density: 1 $J/cm^2$, repetition frequency: 10 Hz) was used. At this time, laser ablation phenomenon occurs on the surface of $TiO_2$ target 207, and Ti and O ions or neutral particles (atoms, molecules, clusters) were desorbed and then injected at an initial kinetic energy of 50 eV for the ions and 5 eV for the neutral particles primarily in the direction of the target normal line (namely, direction of the normal line with respect to the surface of target 207) while maintaining the size of roughly molecules or clusters. As a result of colliding with ambient noble gas atoms (in this case, He), together with the direction of projection of the desorbed substances scattering, the kinetic energy thereof was dispersed by the atmosphere (in this case, He) resulting in promotion of conjugation and aggregation in the gas phase. As a result, the desorbed substances were deposited in the form of a nanostructure on opposing substrate 209 about 35 mm away. Thus, the average particle diameter of the titanium oxide deposited on the substrate increased the greater the number of collisions with the ambient gas atoms, or in other words, the higher the pressure of the ambient gas. Furthermore, the temperatures of substrate 209 and target 207 are not required to be aggressively controlled.

Figure 3:
FIG. 3 shows the observation results (image drawing) obtained from a scanning electron micrograph of a titanium oxide nanostructure in an embodiment of the present invention.
Figure 3:
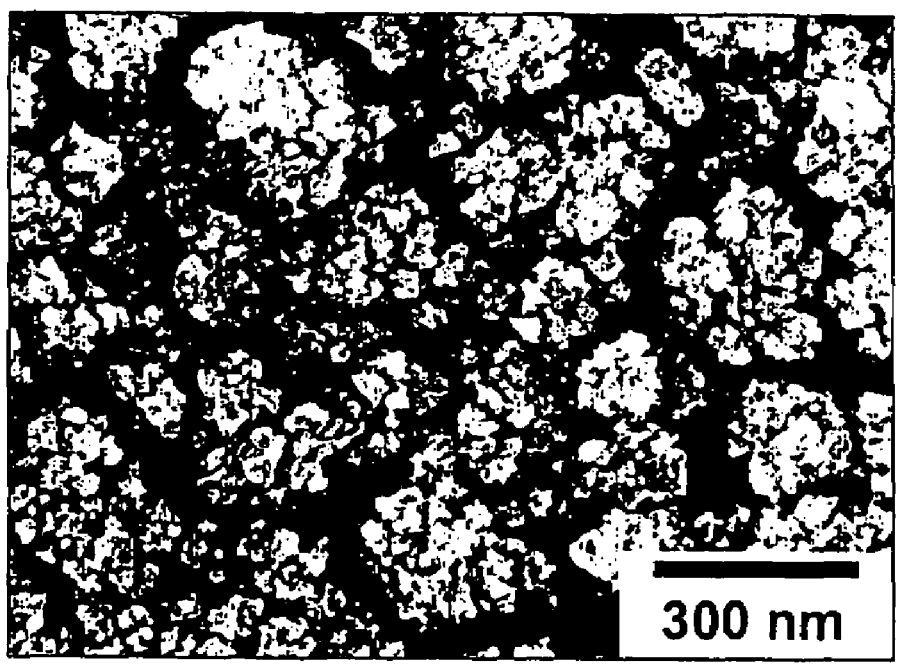

The microstructure of the titanium oxide deposited by changing the pressure of the He gas used for the ambient gas over a range of 10 to 1000 Pa according to the above-mentioned method was evaluated by observing with a scanning electron microscope. As a result, a thin film-like deposit composed of primary particles having a minimum component unit of about several nanometers was obtained at 10 Pa, and as the pressure increased, the particle diameter of the primary particles became larger, reaching a particle diameter of several tens of nanometers at 100 Pa. When the pressure was further increased, primary particles having a particle diameter of several tens of nanometers aggregated to form secondary particle structures, and the particle diameter of these secondary particles became larger. Examples of observation results obtained by scanning electron microscopic observation of titanium oxide deposited at He gas pressures of 133 Pa and 667 Pa are shown in FIGS. 3(a) and 3(b), respectively. Titanium oxide (a) deposited at 113 Pa demonstrated a structure in which particles having a minimum component unit of several tens of nanometers were deposited in the form of a thin film. On the other hand, titanium oxide (b) deposited at 667 Pa demonstrated a structure in which primary particles having a minimum component unit of several tens of nanometers aggregated in the form of secondary particles of about 200 to 400 nm, and was determined to form a nanostructure like that schematically shown in FIG. 1. Moreover, as a result of analyzing the composition of the resulting nanostructures, $TiO_2$ having a composition similar to the target was confirmed to be obtained in all cases.

A summary of the above-mentioned results is shown in row (1) of Table 1.

TABLE 1

| | Distance between target and substrate (D) | Ambient gas species | Gas pressure (P) | Structural properties | $\rho \cdot P \cdot D^2$ |
|---|---|---|---|---|---|
| (1) | 35 mm | He | 67 Pa | X | $1.4 \times 10^4$ |
| | | | 133 Pa | X | $2.9 \times 10^4$ |
| | | | 267 Pa | ○ | $5.9 \times 10^4$ |
| | | | 667 Pa | ◎ | $1.5 \times 10^5$ |
| | | | 1330 Pa | ○ | $2.9 \times 10^5$ |
| (2) | 35 mm | Ar | 67 Pa | ◎ | $1.5 \times 10^5$ |
| | | | 133 Pa | ◎ | $2.9 \times 10^5$ |
| | | | 667 Pa | △ | $1.5 \times 10^6$ |
| (3) | 50 mm | He | 67 Pa | △ | $3.0 \times 10^4$ |
| | | | 133 Pa | ○ | $6.0 \times 10^4$ |
| | | | 667 Pa | ◎ | $3.0 \times 10^5$ |
| | | | 1330 Pa | △ | $6.0 \times 10^5$ |

As shown in Table 1, in the case of a distance (D) between the target and substrate of 35 mm and using He for the ambient gas, a nanostructure like that schematically shown in FIG. 1 was determined to be formed over a gas pressure (P) range of about 200 to 1000 Pa.

Although He gas was used for the ambient gas in the above-mentioned evaluation, other inert gases such as Ar, Kr, Xe or $N_2$ may also be used. In this case, the pressure may be set so that the gas density is the same as in the case of using He gas. For example, in the case of using Ar (gas density: 1.78 g/l) for the ambient gas, the pressure may be set to be about 0.1 times that of He (gas density: 0.18 g/l).

The results of evaluating the microstructure of titanium oxide deposited by changing the gas pressure using Ar for the ambient gas by observing with a scanning electron microscope are summarily shown in row (2) of Table 1. A secondary aggregated structure was determined to be obtained at a pressure that is one digit smaller than in the case of using He gas.

Moreover, there is a correlation between pressure (P) of the ambient gas and distance (D) between the target and substrate in laser ablation. Substances injected from the target by laser radiation form a plasma state referred to as a plume. Since this plume is subject to the effects of collision with the ambient gas, the size of the plume is dependent on the gas pressure, and the size becomes smaller the higher the gas pressure. Moreover, the properties of the substrate deposit are largely dependent on the speed of the injected substances when reaching the substrate from the target. Consequently, in order to obtain similar properties, a correlation exists whereby $PD^n=$ a constant as a process condition at which the above-mentioned speed is constant, and the value of n is about 2 to 3. Thus, in the case the value of D is doubled, the corresponding gas pressure may be about ¼ to ⅛.

The results of evaluating the microstructure of titanium oxide deposited by changing the He gas pressure using a distance (D) between the target and substrate of 50 mm by observing with a scanning electron microscope are summarily shown in row (3) of Table 1. A secondary aggregated structure was determined to be obtained at a pressure of about ½ that in the case of D=35 mm.

As has been described above, it was determined from the structural properties of Table 1 that, when gas density is taken to be $\rho$ (grams/liter), gas pressure is taken to be P (pascals), and the distance between the target and substrate is taken to be D (mm), a nanostructure is obtained if $\rho \cdot P \cdot D^2$ is from $3.0 \times 10^4$ to $6.0 \times 10^5$. Furthermore, $\rho \cdot P \cdot D^2$ is more preferably from $5.9 \times 10^4$ to $3.0 \times 10^5$, and even more preferably from $1.5 \times 10^5$ to $3.0 \times 10^5$.

Furthermore, in the case the pressure of the ambient gas is low in particular, the oxygen injected from the target may be evacuated in the form of gas molecules causing oxygen to escape from the oxide semiconductor nanostructure deposited on the substrate. In such cases, a mixed gas of an inert gas and an oxidizing gas may be used for the ambient gas. In this case, since the substances (consisting mainly of atom, ion, clusters) injected from the target by laser radiation reach the substrate by means of chemical interaction with the oxidizing gas (oxidation reaction) in addition to physical interaction with the inert gas (collision, scattering and entrapment effects), oxidation of the oxide semiconductor nanostructure deposited on the substrate can be accelerated. Examples of gases used for the oxidizing gas include $O_2$, $O_3$, $N_2O$ and $NO_2$, and compatibility with other processes can be achieved in comparison with the case of using oxidizing gas alone by making the ratio of the oxidizing gas from 0.1 to 50% in terms of the mass flow rate ratio. In this case as well, the pressure may be set so that the average gas density of the ambient mixed gas is equal to the case of the above-mentioned He gas.

Moreover, it is effective to activate the oxidizing gas by imparting energy thereto. For example, in the case of using an ArF excimer laser for the laser light source, since the molecules are easily decomposed by laser radiation resulting in the formation of active oxygen atoms or ions, the oxidation of the injected substance from the target is accelerated.

As an example thereof, a secondary aggregated structure similar to FIG. 3(b) was obtained as a result of using He-diluted 1% $O_2$ gas for the ambient gas and depositing titanium oxide at a gas pressure of 667 Pa.

In addition, it may also be necessary to further adjust the composition and crystallinity of the titanium oxide nanostructure obtained using the method described above. In such cases, it is effective to add a step wherein the substrate is heated to a temperature range of 200° C. to 500° C. and then held at a constant temperature. For example, when a sample was measured by X-ray analysis after having carried out heat treatment in oxygen gas on a titanium oxide nanostructure deposited at an He gas pressure of 667 Pa, the crystallinity of the nanostructure was determined to have improved. Alternatively, a nanostructure was obtained in which titanium oxide was doped with nitrogen by carrying out heat treatment in nitrogen gas on a titanium oxide nanostructure deposited at an He gas pressure of 667 Pa.

As has been described above, the production process of a titanium oxide nanostructure of the present embodiment enabled the production of a nanostructure that reflected the target composition by controlling the pressure of the ambient gas, even if an oxygen-free inert gas was used, without requiring heating of the substrate. This result indicated that an oxide semiconductor nanostructure having a structure composed of secondary particles in which primary particles are aggregated and which maintains the composition of target 307 can be produced by optimizing the interaction (collision, scattering and entrapment effects) between the substance injected from the target by laser radiation (consisting mainly of atom-ion clusters) and the ambient gas.

Moreover, as is clear from the above-mentioned results, the average particle diameter of at least one of the primary particles and secondary particles can be controlled with the pressure of the ambient gas. Thus, in the above-mentioned production process of the oxide semiconductor nanostructure, the structure of the nanostructure in the direction of deposition, and even the physical properties of the nanostructure produced, can be controlled by changing the intake pressure of the ambient gas during laser ablation.

EXAMPLES

The following provides a more detailed explanation of the characteristics of the present invention by indicating examples and comparative examples thereof. However, the scope of the present invention is not limited by these examples.

Example 1

A photovoltaic cell of the present invention was produced. A conductive substrate in which conductive film 45 was formed on glass substrate 44 by forming an ITO thin film of 100 nm by sputtering was used for conductive substrate 42. Semiconductor electrode 41 was produced thereon by forming oxide semiconductor layer 43 by directly depositing a titanium oxide nanostructure at a thickness of about 500 nm under the conditions shown in Table 2 using the production process of an oxide semiconductor nanostructure explained in the above-mentioned embodiment.

TABLE 2

| Sample | Distance D between target and substrate (mm) | Ambient gas (pressure) | Physical state of deposit |
|---|---|---|---|
| 1 | 35 | He gas (67 Pa) | Thin film (no secondary aggregation) |
| 2 | 35 | He gas (667 Pa) | Average particle diameter of secondary particles: 300 nm |
| 3 | 50 | He gas (667 Pa) | Average particle diameter of secondary particles: 500 nm |

After laminating this semiconductor electrode 41 with a counter electrode 51, in which conductive film 54 composed of a platinum thin film (30 nm) was formed on ITO glass substrate 53, the edges were sealed with an epoxy adhesive while leaving a partial opening, and an electrolyte was allowed to penetrate between both electrodes using capillary action to form electrolyte layer 52. An electrolyte obtained by dissolving 1.44 g of tetrapropyl iodide and 0.076 g of iodine in 10 ml of a mixed solution of ethylene carbonate and acetonitrile (volume ratio: 4:1) was used for the electrolyte.

The photovoltaic cell was assembled in this manner. The short-circuit current (photoelectromotive current) that flows between the semiconductor electrode and counter electrode while irradiating the semiconductor electrode with monochromatic light (wavelength: 350 nm) having illuminance of 500 μW/cm² was measured. As a result, the values of the photoelectromotive current for the titanium oxide nanostructures of samples 1 to 3 were 8 μA/cm², 15 μA/cm² and 10 μA/cm², respectively.

In this manner, a photovoltaic cell (samples 2 and 3) using a semiconductor electrode having the structure of the present invention was confirmed to be able to demonstrate a high photoelectromotive current value as compared with sample 1. In addition, as is clear from comparing samples 2 and 3, sample 2, which was irradiated at a wavelength closer to the average particle diameter of the secondary particles, was determined to be able to demonstrate a higher photoelectromotive current value than sample 3.

Example 2

A photovoltaic cell of the present invention was produced. A conductive substrate in which conductive film 45 was formed on glass substrate 44 by forming an ITO thin film of 100 nm by sputtering was used for conductive substrate 42. Oxide semiconductor layer 43 was formed thereon by directly depositing a titanium oxide nanostructure at a thickness of about 500 nm under the conditions shown in Table 3 using the production process of an oxide semiconductor nanostructure explained in the above-mentioned embodiment. Moreover, semiconductor electrode 41 was produced by immersing in an ethanol solution of tris-bipyridyl Ru (concentration: 10⁻³ mol/l) and adsorbing a sensitizing dye.

TABLE 3

| Sample | Distance D between target and substrate (mm) | Ambient gas (pressure) | Physical state of deposit |
|---|---|---|---|
| 4 | 35 | He gas (67 Pa) | Thin film (no secondary aggregation) |
| 5 | 35 | He gas (667 Pa) | Average particle diameter of secondary particles: 300 nm |
| 6 | 50 | He gas (667 Pa) | Average particle diameter of secondary particles: 500 nm |

After laminating this semiconductor electrode 41 with a counter electrode 51, in which conductive film 54 composed of a platinum thin film (30 nm) was formed on ITO glass substrate 53, the edges were sealed with an epoxy adhesive while leaving a partial opening, and an electrolyte was allowed to penetrate between both electrodes using capillary action to form electrolyte layer 52. An electrolyte obtained by dissolving 1.44 g of tetrapropyl iodide and 0.076 g of iodine in 10 ml of a mixed solution of ethylene carbonate and acetonitrile (volume ratio: 4:1) was used for the electrolyte.

The photovoltaic cell was assembled in this manner. The short-circuit current (photoelectromotive current) that flows between the semiconductor electrode and counter electrode while irradiating the semiconductor electrode with monochromatic light (wavelength: 530 nm) having illuminance of 500 μW/cm² was measured. As a result, the values of the photoelectromotive current for the titanium oxide nanostructures of samples 4 to 6 were 13 μA/cm², 28 μA/cm² and 39 μA/cm², respectively.

In this manner, a photovoltaic cell (samples 5 and 6) using a semiconductor electrode having the structure of the present invention was confirmed to be able to demonstrate a high photoelectromotive current value as compared with sample 4. In addition, as is clear from comparing samples 5 and 6, sample 6, which was irradiated at a wavelength closer to the average particle diameter of the secondary particles, was determined to be able to demonstrate a higher photoelectromotive current value than sample 5.

Comparative Example 1

Comparative samples 1 to 3 were produced in the same manner as the samples 1 to 3 of Example 1 with the exception of forming the oxide semiconductor nanostructure in the state in which the substrate was disposed nearly perpendicular to the target plate (off-axis state) during production of an oxide semiconductor nanostructure. In comparative samples 1 to 3 thus obtained, only a thin film-like deposit was formed on the substrate in the same manner as samples 1 and 4, and the thickness thereof was only about 50 nm.

Photovoltaic cells were respectively assembled in the same manner as Example 1 using these comparative samples 1 to 3. The short-circuit current (photoelectromotive current) of each of these photovoltaic cells was measured in the same manner as Example 1. As a result, the photoelectromotive current values of the titanium oxide nanostructures of comparative samples 1 to 3 were 1 μA/cm², 2 μA/cm² and 1 μA/cm², respectively.

As described above, an increase in photoelectromotive current was observed in the photovoltaic cells obtained in the examples since an oxide semiconductor layer composed of a titanium oxide nanostructure having a secondary particle structure was employed in the semiconductor electrode. The reason for that is presumed as follows. Namely, titanium oxide having few lattice defects and so forth is formed in a clean process having reduced levels of contamination and damage. And, by employing a structure composed of secondary particles in which primary particles are aggregated, in addition to the quantum efficiency being increased due to efficient charge separation in the primary particles, the utilization efficiency of the incident light is improved by the secondary particle structure. As a result, a high photoelectric conversion function can be achieved.

INDUSTRIAL APPLICABILITY

A semiconductor electrode of the present invention can be used in voltaic cells and a wide range of other applications (such as sensors and switches) in which photoelectromotive force is used.

A photovoltaic cell of the present invention can be preferably used in, for example, a dye-sensitized solar cell due to the superior photoelectric conversion function thereof.

The invention claimed is:

1. An electricity generation method of a photovoltaic cell comprising a semiconductor electrode, an electrolyte and a counter electrode, the semiconductor electrode provided with an oxide semiconductor layer having a photocatalytic activity, the oxide semiconductor layer containing secondary particles in which primary particles composed of a metal oxide are aggregated, and the average particle diameter of the primary particles being from 1 nm to 50 nm and the average particle diameter of the secondary particles being from 100 nm to 10 µm, the method comprising the step of irradiating the semiconductor electrode with light having a wavelength substantially equal to the average particle diameter of the secondary particles.

2. The method according to claim 1, wherein the metal oxide is an oxide containing at least one type selected from the group consisting of titanium, tin, zinc, zirconium, niobium, cesium, tungsten, copper, iron and vanadium.

3. The method according to claim 1, wherein the metal oxide is at least one type selected from the group consisting of titanium oxide, tin oxide, zinc oxide, zirconium oxide, niobium oxide, cesium oxide, tungsten oxide, copper oxide, iron oxide, vanadium pentoxide, strontium titanate, barium titanate, sodium titanate, $K_4Nb_6O_{17}$, $Rb_4Nb_6O_{17}$, $K_2Rb_2Nb_6O_{17}$ and $Pb_{1-x}K_{2x}NbO_6(0<x<1)$, or a mixed oxide containing two or more types of these oxides.

4. The method according to claim 1, wherein the oxide semiconductor layer is formed on a conductive substrate.

5. The method according to claim 1, wherein a dye is loaded onto the oxide semiconductor layer.

6. A method for producing a semiconductor electrode for generating photoelectromotive force, the method comprising the step of irradiating a target plate composed of a metal oxide with laser light in an ambient gas to eliminate and deposit the component of the target plate on a substrate opposing the target plate in a substantially parallel manner in order to produce the semiconductor electrode used in a photovoltaic cell, wherein (a) the electrode comprises an oxide semiconductor layer containing secondary particles in which primary particles composed of a metal oxide are aggregated; (b) the average particle diameter of the primary particles is from 1 nm to 50 nm, and the average particle diameter of the secondary particles is from 100 nm to 10 µm; and (c) the photovoltaic cell generates electromotive force by irradiating the semiconductor electrode with light having a wavelength substantially equal to the average particle diameter of the secondary particles, wherein, when the gas density of the ambient gas is defined as $\rho$ (grams/liter), the gas pressure of the inert gas is defined as P (pascals), and the distance between the target plate and the substrate is defined as D (millimeters), then $\rho \cdot P \cdot D^2$ is from $3.0 \times 10^4$ to $6.0 \times 10^5$.

7. The method according to claim 6, wherein an inert gas is used as the ambient gas.

8. The method according to claim 6, wherein a mixed gas of an inert gas and a reactive gas is used as the ambient gas.

9. The method according to claim 8, wherein the ratio of the reactive gas is from 0.1% to 50% in terms of the mass flow rate ratio.

10. The method according to claim 8, wherein the reactive gas is an oxidizing gas.

11. The method according to claim 10, wherein the oxidizing gas is a gas containing oxygen gas.

12. The method according to claim 8, wherein the reactive gas is activated by imparting energy thereto.

13. The method according to claim 6, wherein the average particle diameter of at least one of the primary particles and secondary particles is controlled by changing the pressure of the ambient gas.

14. The method according to claim 6, further comprising a step of heating the component.

15. The method according to claim 14, wherein the heating temperature is from 500° C. to 900° C.

16. The method according to claim 6, wherein the $\rho \cdot P \cdot D^2$ is from $5.9 \times 10^4$ to $3.0 \times 10^5$.

17. The method according to claim 6, wherein the $\rho \cdot P \cdot D^2$ is from $1.5 \times 10^5$ to $3.0 \times 10^5$.